Oct. 19, 1954  A. ALFORD  2,692,335
BALANCED COUPLING UNIT FOR HIGH-FREQUENCY TRANSMISSION
Filed Feb. 9, 1950  4 Sheets-Sheet 1
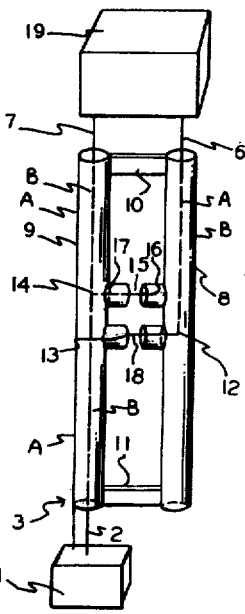
FIG. 1
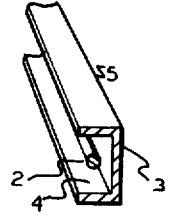
FIG. 2a
FIG. 2b
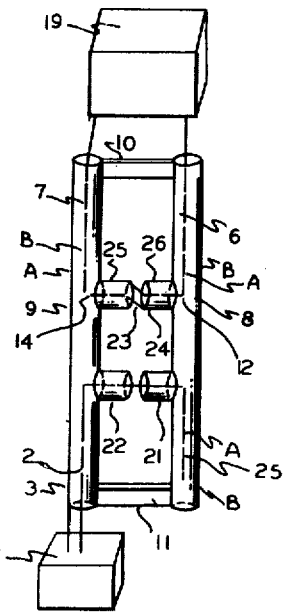
FIG. 3
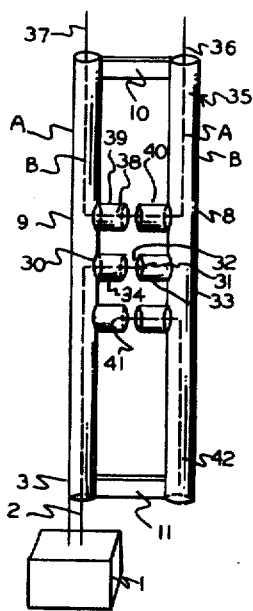
FIG. 4
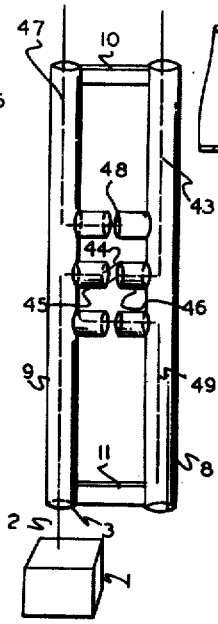
FIG. 5
FIG. 6
INVENTOR.
BY Andrew Alford
Ezekiel Wolf
his Attorney Oct. 19, 1954 A. ALFORD 2,692,335
BALANCED COUPLING UNIT FOR HIGH-FREQUENCY TRANSMISSION
Filed Feb. 9, 1950 4 Sheets-Sheet 2

INVENTOR.
Andrew Alford
BY

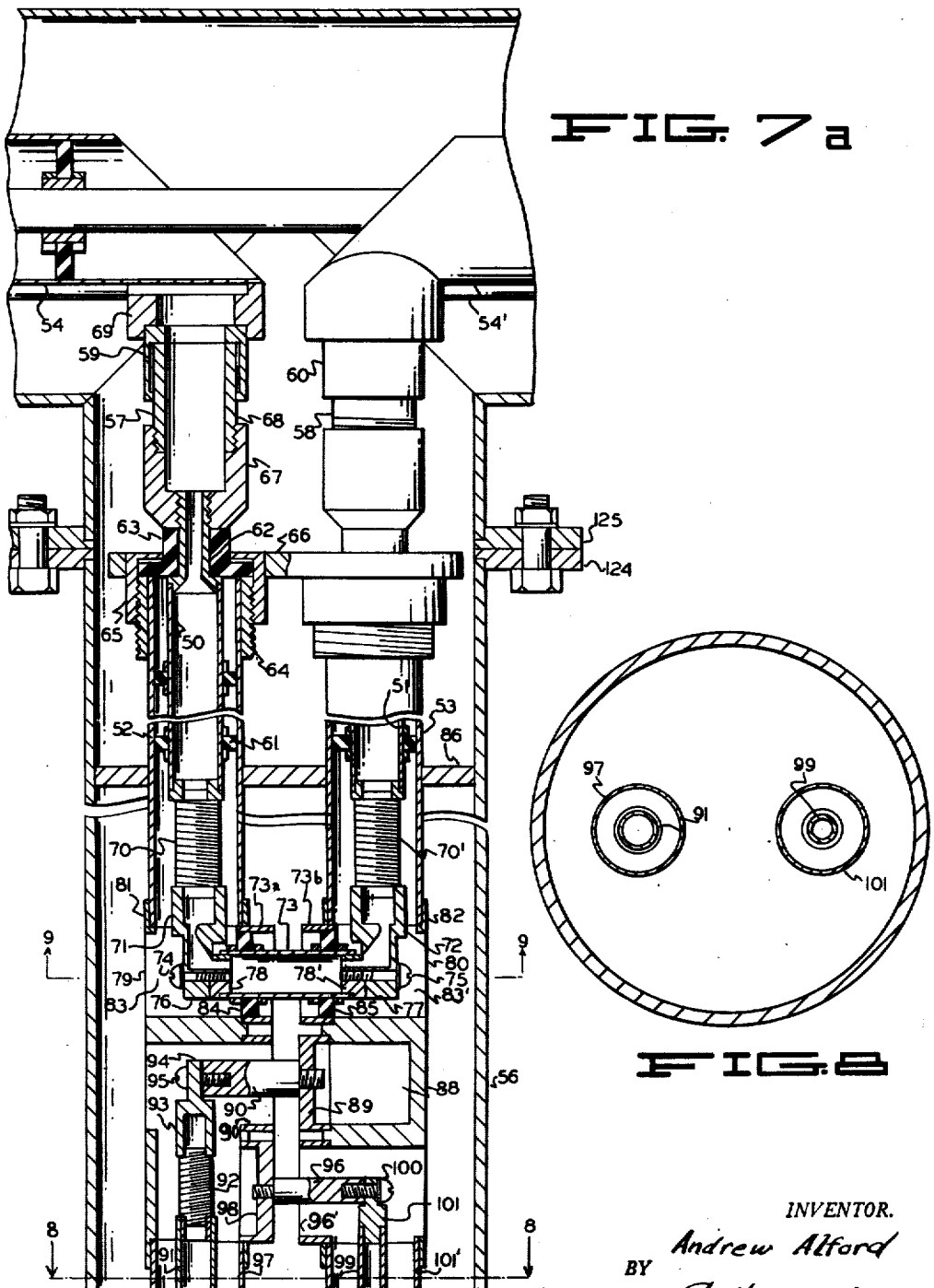

Oct. 19, 1954 A. ALFORD 2,692,335
BALANCED COUPLING UNIT FOR HIGH-FREQUENCY TRANSMISSION
Filed Feb. 9, 1950 4 Sheets-Sheet 4

INVENTOR.
Andrew Alford
BY
*his Attorney*

Patented Oct. 19, 1954

2,692,335

UNITED STATES PATENT OFFICE 2,692,335

BALANCED COUPLING UNIT FOR HIGH-FREQUENCY TRANSMISSION

Andrew Alford, Cambridge, Mass.

Application February 9, 1950, Serial No. 143,333

4 Claims. (Cl. 250—33)

The present invention is related to feeding systems associated with antennas used in connection with television, radar and with other high frequency systems.

One object of my invention is to provide a convenient and efficient means for connecting a coaxial transmission line to a balanced transmission line or for connecting a coaxial transmission line to a balanced antenna.

Another object of my invention is to provide a combination of a means for connecting a balanced transmission line to a coaxial transmission line with an impedance transforming means.

Each of these objects must be accomplished with efficiency as regards mechanical construction, electrical continuity or matching from one part of the system to the next, and radiation or transmission must be efficient over a comparatively wide frequency band.

In the drawings, Figure 1 shows diagrammatically one embodiment of my invention.

Figures 2a and 2b show details of two types of coaxial transmission line which may be used in connection with my invention.

Figure 3 shows another embodiment of my invention.

Figure 4 shows a still another embodiment of the invention.

Figure 5 shows a still further embodiment of my invention.

Figure 6 is a diagrammatical view of the arrangement of Figure 7a.

Figures 7a and 7b show together a full cross section of a complete embodiment of my invention as tied in with a balanced antenna.

Figure 8 shows a cross section taken on the line 8—8 of Figure 7a.

Figure 9 shows a cross section taken on the line 9—9 of Fig. 7a.

Figure 7B:
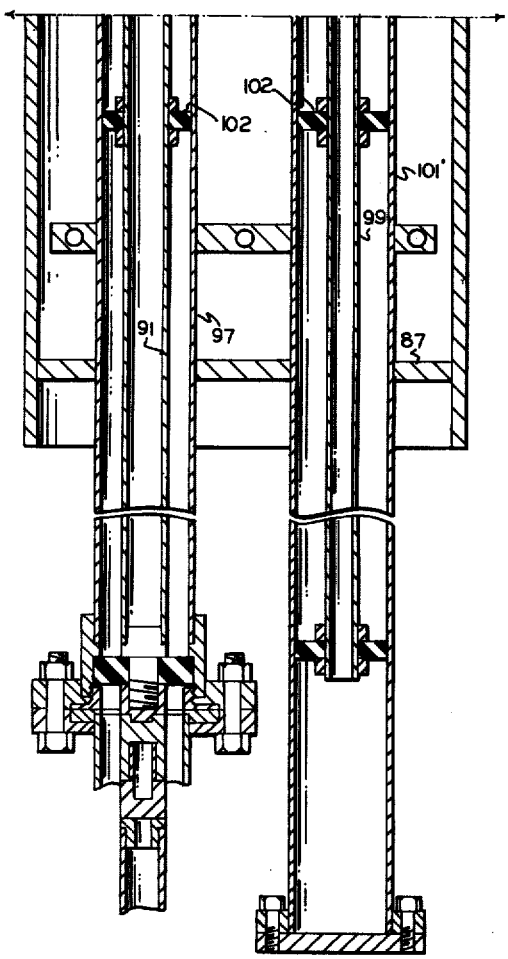

In Figure 1, a translating device 1 is connected to a coaxial transmission line comprising an inner conductor 2 which is completely or partially surrounded by an outer conductor 3 of the type shown in Figures 2a and 2b. An important property of such a transmission line is that the outer surface 5 of the outer conductor 3 remains at a substantially ground potential while high frequency currents propagate along the inner conductor 2 and the inner surface of the outer conductor 3. Even when the outer conductor 3 is a channel which does not completely surround the inner conductor 2, as illustrated in Figure 2a, the high frequency currents propagate on the inner conductor and along the inner surface 4 of the outer conductor. The high frequency currents along the outer surface 5 of the outer conductor 3 are relatively small in comparison with the currents along the inner surface so that the outer surface 5 remains at a substantially ground potential.

In order to effect a connection between a coaxial transmission having an outer conductor which is at a substantially ground potential to a balanced transmission consisting of conductors such as 6 and 7 in Figure 1, it is necessary to use a network which converts a high freqency potential between the inner conductor and ground into two equal but opposite potentials between each of the two balanced line conductors and ground.

In accordance with my invention this connection between a balanced line and a coaxial line may be accomplished by making use of a closed frame circuit comprising two conductors such as 8 and 9 in Figure 1 and two cross connects such as 10 and 11. The four conductors 8, 9, 10, and 11 may be the same conductor bent back on itself and connected to itself so as to form an oval, or a rectangular loop.

In order to make use of the closed loop circuit 8, 9, 10, 11 to accomplish the transformation from a coaxial line to a balanced line or vice versa, cross connections must be made between the loop conductors 8, 10, 9, 11, the conductors 7, 6, of the balanced line and the innner and the outer conductors, 2, 3 of the coaxial line.

In accordance with the embodiment of my invention shown in Figure 1, one conductor of the balanced line, for example conductor 6, goes part way through conductor 8, of the loop. Conductors 6 and 8 are insulated from each other so as to form a concentric line. Similarly, the other conductor of the balanced line, conductor 7, is put through another portion of the loop, conductor 9. Conductors 7 and 9 are also insulated from each other so as to form a concentric line. The inner conductor 7 of this line is connected to the inner conductor 2 of the main feeder 2, 3. The outer conductor 9 is connected to the outer conductor 3, of the main feeder 2, 3.

Further in accordance with the embodiment of my invention illustrated in Figure 1, conductor 6 passes through a hole 12 in conductor 8 and is connected at 13 to conductor 9 by the short strip 18. Conductor 7 is branched at junction 14 and connected by means of conducting strip 15 to the external conductor 8 at 16 after passing through hole 17 in conductor 9.

The potential existing on conductor 6 is substantially equal to but opposite in phase to potential of conductor 7 provided that the distance between conductors 9 and 8, as well as the distance between the two cross connections 15, 18 are made a small fraction of the operating wavelength. Under such conditions, the potential at junction 14 is very nearly equal and opposite to the potential at 12 where conductor 6 is connected to cross connection 18.

The best operation of the circuit is obtained when cross connections 15, 18 are approximately half way between the end sections 11 and 10 of the looped conductor circuit and when the distance between these points is between 50 and 300 electrical degrees of the mean operating wavelength and half wavelength multiples thereof. The circuit, however, is operative as long as the distance from the cross connections 15 and 18 to either points 10 or 11 at the end of the loop differs from an integral number of half wavelengths by a length equal to several times and preferably at least eight times the length of the cross connections 18, 15.

The cross connections need not be substantially half way between the ends of the loop conductor but may be removed from the center by a substantial distance in terms of the wavelength, such as for example, an eighth of the operating wavelength. The distance between the end of the loop circuit for best operations depends upon the load impedance.

Consideration of the arrangement of Figure 1 shows that at the cross connections two parallel circuits are established with the potentials along the inner conductors 6 and 7 at corresponding places being of the same magnitude but opposite phase running upwards in the Figure 1 to the end. The phase along the inner walls of conductors 8 and 9 will be 180° out of phase respectively to that of conductors 6 and 7, thus providing a balanced line.

The circuit of Figure 1 may act as an impedance transformer having a four to one impedance ratio. In order to visualize this action let it be assumed that the input impedance of load device 19, connected to the balanced transmission line 7, 6, is 200 ohms. Then, if the diameters of those portions of conductors 7 and 6 which are within conductors 8 and 9, are chosen so that the characteristic impedances of coaxial lines 6, 8 and 7, 9 are each 100 ohms, the impedance at junction 14, 13 will be equal to that of two 100 ohm lines in parallel, that is, to 50 ohms. Under such conditions the impedance presented to the coaxial feeder 2, 3 at junction 14 will be 50 ohms. Since a coaxial transmission line having a 50 ohm impedance has both practical dimensions and good power handling characteristics the 50 ohm impedance level presented at junction 14, 13, is convenient. Balanced transmission lines having characteristic impedance of 200 ohms also have practical dimensions and suitable electrical characteristics for many applications. It will be clear to those well versed in the art that the impedance levels described above may be modified for special applications by the use of quarter wave transformers and by other means in order to correspond to the specifications of a particular problem. For example, when the balanced load impedance is 50 ohms one may use two 50 ohm quarter wave transformers to step up the 25 ohm impedance of each half of the 50 ohm load to 100 ohm level at junction 14 where the two 100 ohm impedances will then be effectively connected in parallel so that the input impedance presented to the coaxial feeder 2, 3 will again be 50 ohms.

Another embodiment of my invention is shown in Figure 3. In this embodiment the translating device 1 is connected or coupled to a coaxial feeder 2, 3 which energizes a closed loop circuit comprising conductors 8, 9, 10 and 11. A balanced load 19 is connected or coupled to a balanced line comprising conductors 6 and 7 which extend into hollow conductors 8 and 9. The cross connections between the several conductors are made as follows: One conductor 7 of the balanced line, passing through a hole in wall 9 is connected to the opposite conductor 8 of the loop. Similarly, the other balanced line conductor 6, after passing through a hole in wall 8 on the second side of the loop is connected to the opposite, first side of the loop.

The inner conductor 2 of coaxial line 2, 3 passes through a hole in the first side 9, of the closed loop conductor and is connected or coupled to the opposite, second side 8 of the loop by continuing the inner conductor at 25' back through the conductor 8.

The preferable form of the cross connection or coupling between the inner conductor 2 and the side of the loop conductor is to provide metal tubes 21, 22 and 25, 26 which shield the cross connections such as 23 except for narrow central gaps, such as 24. Shielding tubes 21, 22 and 25, 26 are connected to the adjacent sides of the loop circuit. The effect of these shielding tubes is to insure that the potential developed between conductors 8 and 9 as a result of cross connection or cross coupling, such as 23 is applied at a point which is equidistant from the two sides of the loop whereby more nearly equal and opposite voltages result along opposite points on conductors 8 and 9.

The arrangement of Figure 3, in addition to functioning as converter from a coaxial transmission line to a balanced transmission line or vice versa also, may be so proportioned as to provide a four to one impedance transformation. For example, suppose that device 19 connected to the balanced line has an impedance of 200 ohms. Each of the coaxial lines 7, 9 and 6, 8 may be designed as 100 ohm lines and the feeder 2—3 may be designed as a 50 ohm line.

In the arrangement in Figure 4, the coaxial cable 2 and 3 from the translating device 1 is connected to the loop formed by the outer conductors 8 and 9 and the cross end strips 10 and 11 by continuing the outer conductor 3 of the concentric cable similarly as in Figures 1 and 3. The inner conductor 2, however, continues upward within the conductor 9 and is lead through a hole 30 in the hollow tube 9 and connected to plate 31 which caps the tube 33 connected to the outside of the hollow conductor 8 forming the other side of the loop. The short conducting element is designated as 32 and is surrounded by hollow tube sections 34 similarly as described in connection with Figure 3. The coupling loop for the balanced line is in Figure 4 provided with a continuous conductor 35 which has one end 36 concentric with the tube 8 in its upper section and the other end 37 concentric with the tube 9 in its upper section. This is one continuous conductor and passes through the walls of both tubes 8 and 9 in a cross section 38 which is surrounded by two short sleeves 39 and 40 serving to form a concentric cable for the short sections in which the inner conductor extends from one side of the loop to the other. A third reactance element 41 may be connected to the wall of the tube 9 and extend through an opening in the wall of the tube 8 and backwards as indicated by the section 42 towards the position of the lower end of the loop. This arrangement will present to the coaxial feeder cable 2—3 the series impedance of both the sides of the balanced line, namely the impedance from 37 to 9 and from 36 to 8 in series so that the transformation from feeder 2—3 to the balanced transmission line 36—37, as might be measured with the continuous conductor 36—37 opened and the tubes 38 and 40 temporarily connected at the gap for the measurement, remains at a 1:1 ratio.

The arrangement of Figure 4 should have the same dimensional arrangements as expressed in connection with Figure 1, and the cross connecting sections should preferably be short and placed close together. The arrangement shown in Figure 5 includes the same general elements as shown in Figure 4 with the coaxial cable feed 2 and 3 and the loop formed of the hollow conductors 8 and 9 and the cross ends 10 and 11. In this case, the inner conductor 2 extends upward through the hollow conductor 9 and crosses over through holes in the tube 9 and connects by means of the cross conductor 44 to the outer hollow conductor 8. The inner conductor 43 of the hollow tube 8 connects to the hollow tube 9. The cross-over sections are surrounded by short tube sections 45 and 46 as previously explained. The inner conductor 47 for the hollow tube 9 which together with the conductor 43 form the connections for the balanced line is connected through a hole in the tube 9 to the outer conductor 8 by means of conductor 48. A reactance element 49 may be extended from the tube 9 through a hole in the tube 8 and downward towards the end 11 of the loop. In Figure 5 each balanced section is effectively shunted across the coaxial feed line 2—3 and therefore the transformation ratio is 4:1.

The arrangement shown in Figure 6 is the same as in Figure 4 as far as the loop structure is concerned and the same numerals are applied to the same corresponding elements in Figure 6 as in Figure 4. Figure 6 in addition shows in simplified form the antenna unit and the surrounding shield for the loop which are more specifically illustrated in Figure 7a.

The arrangement shown in Figure 7a has the same transforming unit from the single coaxial cable to the balanced line that is shown in Figure 4, but since the semblance of the structure is different, new numerals will be applied. The inner conductors 36 and 37 of Figure 4 are in Figure 7a represented by the tubes 50 and 51 respectively which are concentric with outer conductors 52 and 53 respectively. The inner conductors 50 and 51 are connected at their top ends to a balanced antenna unit of the type which has been already described in the application of Henry Jasik, Serial No. 79,969, filed March 7, 1949. However, the two conductors 50 and 51 may be connected to any other type of balanced unit and no invention is herein claimed with respect to the type of balanced antenna in and of itself to which connections are made. The complete coupling unit represented within the outer casing 56 is all assembled as a unit with means for inserting the ends 57 and 58 of the conductors 50 and 51 in sockets 59 and 60 respectively, attached to the balanced antenna system of which a small part is shown by the inner ends by the tubes 54 and 54' (Figures 6 and 7a). The antenna arrangement is shown schematically in Figure 6 where the tubes 54 and 54' connect to the cylinders 55 and 55' respectively, the inner ends of which form capacitative gaps with the horizontal extensions of the sleeve 56.

Figure 9:
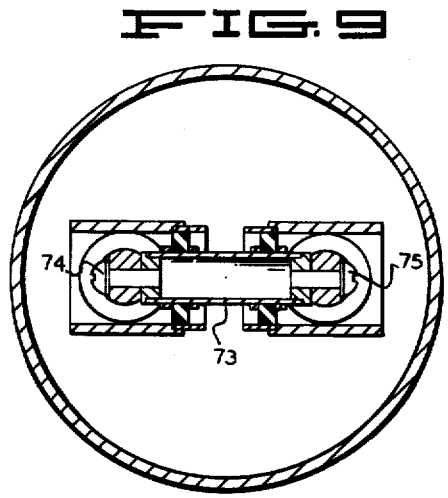

The conducting tube 50, Figure 7a, which is spaced by insulators 61, 61 from the outer conductor tube 52 is at its end provided with a hollow threaded stud 62 silver-soldered or welded in the end of the tube 50 and passing through an insulating collar 63 which surrounds it and which serves to insulate the end of the conductor from the structure supporting the outside conductor 52. The outside of the conductor 52 corresponding to 9 in Figure 6 is provided with a threaded sleeve 64 rigidly attached to it and over this is screwed down a threaded cap 65 which clamps the cylindrical flange of the insulator 63 and thereby rigidly holds the end structure of the tube in place. A spacing plate 66 may be used to support and space the ends of the conductors in their proper relation. Threaded to the end of the stud 62 is a cuplike conductor 67 to which a sleeve 68 may be threaded which serves as the plug or connector fitting in the socket of the receptor 59. It will be seen that an opening is provided down through the connector from the sleeve 69 rigidly secured to the antenna element 54 clear through the inner conductor 50. The purpose of this is to permit the wires to be drawn up for feeding ordinary A. C. or D. C. to energize signs, lights, heating elements, etc. The inner conductor 50 and likewise the conductor 51 terminate in conducting bellow units 70 and 70' to permit leaway in expansion in the inner coductors. These bellow units are hollow and have a cross conductive connection from one to the other by virtue of the connecting end caps 71 and 72 and the structure as more particularly seen in the cross section of Figure 9. There is provided a hollow cross conductor 73 to which the end caps are attached by means of the machine screws 74 and 75 respectively which hold tight flat end sections 76 and 77 against plugs 78 and 78' originally secured in the ends of the cross conductive connection 73. The outer conductors 52 and 53 are supported in coaxial alignment with the caps 71 and 72 by the block elements 79 and 80 which may be formed from solid stock of conductive material and provide at their top, shoulders 81 and 82 in which the tubes 52 and 53 rest. These pieces 79 and 80 are also hollowed out with bores 83 and 83' which are coaxial with the tube 73, supported and spaced by insulating rings 84 and 85 from the surrounding conducting elements. The projecting flanges 73a and 73b coaxial with the cross tube 73 are brought close to one another to preserve the coaxial cable effect substantially bridging the cross connection. In effect, the conductors 50 and 51 form one continuous U-shaped conducting element on one side within the tube 52 and on the other side within the tube 53. The designation above is that of the upper section of the coupling unit in which the U-shaped inner conducting loop connects to the balanced antenna system. The rest of the coupling unit not shown in Figure 7a is shown in Figure 7b. This shows how the coaxial cable is introduced into the unit and the two figures together show how proper compensation may be applied.

Before, however, going further with this description, it should be pointed out that somewhere between the cross connection as shown by the conductor 73 and the ends connecting to the balanced antenna units is a short support or shunting plate 86 which establishes a zero potential at that point for the outside of the tubes 52 and 53 with the outer conducting shell 56. This shorting plate 86 provides a return path for various currents flowing in the present type of coupling system. A similar shorting plate 87 is provided in the lower half of the unit and while these shorting plates are not chosen at random, their position and distance apart from the cross connections may vary considerably.

Where it is desired to convert from a single coaxial line to a balanced line, the shorting plates may be approximately spaced a distance $\lambda/2$ apart where $\lambda$ is the arithmetical mean frequency of the broadcast band. The side of the loop should be spaced close together, preferably a substantially small fraction of the operating mean frequency. However, where cross connecting conductors are suspended by shells or tubes a wider spacing of the sides of the loops is possible. This will be disclosed later. Where additional matching is effected, the distance from the cross connection back to the lower shorting plate may vary considerably dependant upon the desired impedance and its characteristic. The maximum impedance is obtained for λ/4. If a greater spacing is used beyond λ/4 or 90°, the impedance changes sign and becomes negative, the impedance going from $+\infty$ to $-\infty$ and increases negatively as the distance from the cross connection to the lower shorting plate is increased beyond the quarter wavelength.

The elements or plugs 79 and 80 providing structure for the cross-over connections are formed to provide cross-over connections from one side of the unit to the other. For instance, the block 80 is provided with a hollow cylindrical cross section bore 88 perpendicular to the axis of the system to which a cap member 89 is rigidly attached and to which is attached an inner conducting stud 90 to which the inner conductor 91 of the feeder cable is connected. The connecting stud 90 is surrounded by a shell 90' bored in the block 79 corresponding to the arrangement shown diagrammatically in Figures 4 and 6. Any suitable connecting arrangement may be provided to connect this cross connection to the inner conductors of this coaxial bellows as for instance a flexible bellow conductive unit 92 topped with a cap 93 which has a flat connecting plate 94 on its end through which the screw 95 passes holding the cap firmly to the end of the cross connection stud 90. A similar construction is applied for the cross-over conductive stud member 96 to which the outer conductor 97 of the coaxial cable is connected by means of the conductive block 79. The stud 96 is also surrounded by a shell 96'. This block, as will be seen, is drilled with the bore 90' coaxial with the inner conductor 90 and also with one at right angles to it to which the cap member 98 is affixed holding the stud member 96. An inner conductor 99 is connected to the end of the stud member 96 by means of the screw 100 which extends through a hole in a plate projecting from the cap 101' secured to the end of the inner conductor 99 providing a good electrical connection with the stud 96. Surrounding the inner conductor 99 is the outer conductor 101'.

The inner conductor 91 and the outer conductor 97 which really form the coaxial feeding cable are spaced from each other by insulating spacers such as 102, Figure 7b. The lower end of the conductors 91 and 97 may be provided with terminal connection members at the lower end for connecting to the coaxial line from the transmitting source. The inner conductor 99 and outer conductor 101' forming the reactance matching element which are also separated by spaces 102 terminate without any connections below the shorting plate 87. The inner conductor 99 may be terminated above the shorting plate 87 which would decrease the matching reactance.

The reactance of the elements 99 and 101 are shunt reactances as shown in Figure 7a in effect across the coaxial feed and are therefore used to modify the terminal reactance looking from the coaxial cable to the balanced antenna. This shunt may be either capacitative or inductive.

The construction of Figures 7a and 7b has great utility in its sturdiness and constructional stability and also in the fact that the coupling unit and the antenna unit are quickly assembled by means of the plug and socket coupling with no difficulty whatsoever. It also provides complete protection from external sources such as wind and weather, and if desired heating and defrosting elements can be readily used and current supplied to them through the hollow conducting unit of the system as has been previously noted.

Figure 10:
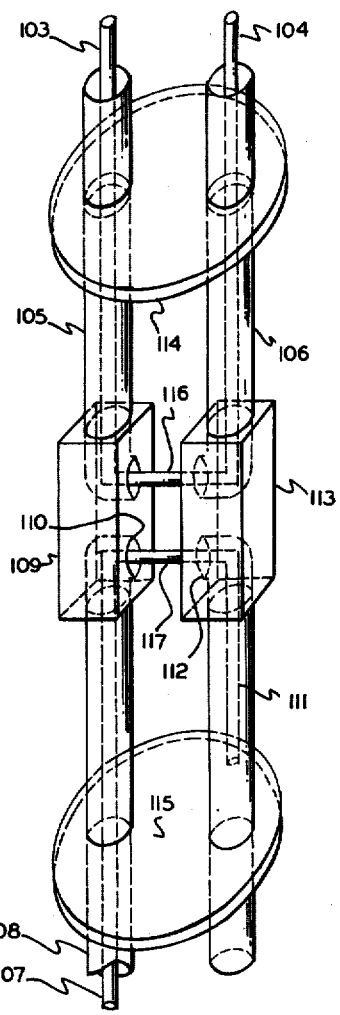
Figure 10 shows in simplified form a further modification of my invention.

In the arrangement indicated in Figure 10, there is shown a simplified schematic coupling unit in which series compensation is used. In this construction, the two conductors 103 and 104 to the antenna elements are continuous and cross over from one outer conductor 105 through an opening in the side of the outer conductor and into the other outer conductor 106. The input coaxial cable comprising the inner conductor 107 and the outer conductor 108 terminate in the block 109 to which the outer conductor 108 is securely attached both mechanically and electrically. The inner conductor 107 crosses through an opening 110 in the block 109 and terminates as an inner conducting element 111 after passing through an opening 112 in the block 113. In this arrangement, two shorting supporting plates 114 and 115 are provided, one on either side of the cross-over connecting members 116 of the U-shaped connector to the antenna elements and 117 of the U-shaped connector to the input element. The cross-over connectors 116 and 117 are close together compared to the mean operating wave length and so also the longer side outer conductors 105 and 106.

Upon consideration of the arrangement shown in Figure 10, it will be seen that the inner conductor 111, which had a length $L_3$, is established as a series compensation in series with the coaxial feed line. This series compensation may be adjusted by adjusting the length of the inner conductor $L_3$. Selection of the diameter of $L_3$ and length control the reactance. Where this in effect is less than a quarter of a wavelength, the reactance will be capacitative and where larger, inductive passing through zero at the critical point. This series compensation will enter into the matching of the coupled antenna system with the feed line.

Figure 11:
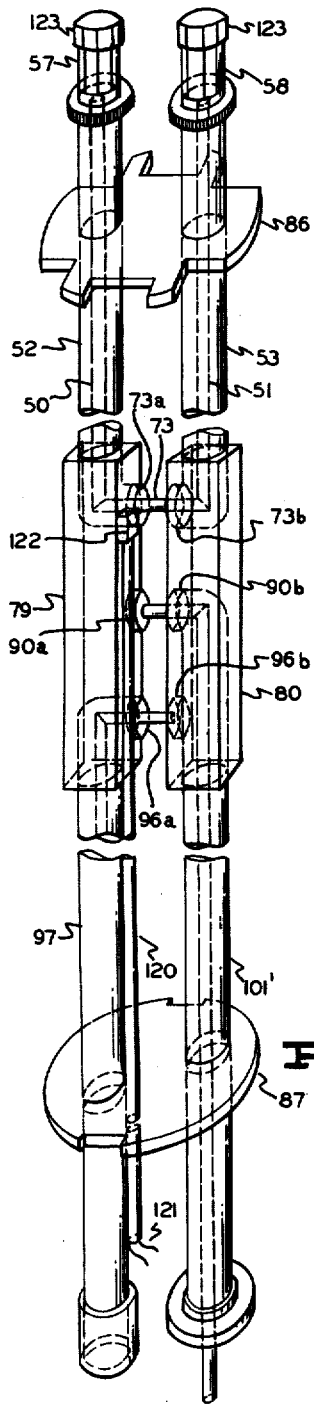
Figure 11 shows a perspective view of a part of the arrangement shown in Figure 7 with provision for heating feeder conductors.

In Figure 11 is shown a simplified perspective view of the arrangement indicated in Figures 7a and 7b of the so-called balun assembly without the antenna elements connected thereto and without the surrounding tube in which the unit rests. The arrangement in Figure 11 is particularly helpful in illustrating the structure of the blocks 79 and 80 which are short compared to the length between the shorting plates 87 and 88. As indicated in Figure 11, the spacing between the outer conductors 97 and 101 and similarly between the hollow conductors 52 and 53 is preferably a very small fraction of the wavelength as compared to their length. The blocks 79 and 80 are provided with shields 73a and 73b projecting towards one another but not quite touching and similarly also shield 90a and 90b surrounding the cross connection 90 and 96a and 96b surrounding the cross connection 96.

The arrangement in Figure 11 also shows the manner in which the heating or signal currents other than the broadcast supply is connected through the unit. Here a pipe 120 is brought up through the plate 87 and in this is contained the conductors 121. The pipe 120 terminates at its upper end in a junction box 122 through which a T connection is made to the hollow conductor 73 forming the cross-over joint between the upper inner conductors 50 and 51. The conducting wires 121 may be carried up through both of the conductors 50 and 51 to both sides of the antenna.

At the top of the unit shown in Figure 11 is the snap-in coupling sockets 57 and 58. These coupling sockets in order to allow a slight amount of elasticity are slotted as indicated at 123 at spaced intervals. The unit when assembled is directly plugged into the antenna unit and is automatically secured simply by this connection.

The outer shell or tube 56 in which the balun or coupling unit is positioned is bolted to the antenna unit in the two opposing flanges 124 and 125, Figure 7a, so that the complete assembly exposes no parts of the internal coupling elements.

The advantages gained in the use of the present system provides a system of transfer from a single coaxial cable to a balanced line of two coaxial cables and this arrangement may be repeated for four and eight balanced lines which find utility in antenna array systems. In addition to this, the transfer from the feed to the load may be accurately matched so that undesirable reflections and losses are avoided.

One of the chief advantages of the present system is the permissible variation in dimensions of the various elements for obtaining the desired coupling characteristics, matching of impedances, elimination of undesired radiation and providing other advantages without hampering the mechanical structural design.

In the loop the two outer side conductors are in general for mechanical reasons maintained close together. Where no surrounding sleeves extend the field about the cross connecting conductors from one side conductor to the other, in order to avoid losses and stray undesired radiation, the side conductors should be maintained at spacings less than $\lambda/20$ where $\lambda$ is the normal operating wavelength or approximately the mean wavelength of the operating band. Where sleeves are used as illustrated in the present invention, a spacing as wide apart as $\lambda/6$ seems to be permissible and perhaps even wider spacings may be used should a mechanical design necessitate such spacings. Where such dimensions are used an outer shield should also be employed. This illustrates the flexibility of the present system.

There are very few other dimensional limitations in the present system. The distance from the cross-over connection to the upper or lower ends of the loop should not be approximately $\lambda/2$ or some value close to this nor an integral multiple thereof. The reason for avoiding these critical dimensions is that when they occur an effective low reactance is shunted across the cross connects and this condition results in undesirable circulatory currents and low efficiency. It will be clear to those versed in the art why this should be avoided.

Having now described my invention, I claim:

1. Means for feeding a balanced transmission line from a coaxial cable comprising a coupling loop having elongated external conductors, one of which forms a part of the external conductor of the coaxial cable, said conductors together forming the sides, and conductive cross-over connections forming the ends of said loop, internal conducting elements associated with the external conductors at one end of the loop forming the balanced line, said internal conductors formed as a continuous conducting element extending across the loop intermediate its ends, and shunt cross-over conducting means including impedance matching elements also intermediate the ends of the loop for coupling said balanced line to said coaxial cable.

2. Means for feeding a balanced transmission line from a coaxial cable comprising a coupling loop having elongated external conductors, one of which forms a part of the external conductor of the coaxial cable, said conductors together forming the sides, and conductive cross-over connections forming the ends of said loop, internal conducting elements associated with the external conductors at one end of the loop forming the balanced line, said internal conductors formed as a continuous conducting element extending across the loop intermediate its ends, and shunt cross-over conducting means including impedance matching elements also intermediate the ends of the loop for coupling said balanced line to said coaxial cable, said means comprising an effective electrical connection from one element of the coaxial cable to one element of the balanced line and from the other element of the coaxial cable to the other element of the balanced line.

3. Means for feeding a balanced transmission line from a coaxial cable comprising a coupling loop having elongated external conductors, one of which forms a part of the external conductor of the coaxial cable, said conductors together forming the sides, and conductive cross-over connections forming the ends of said loop, internal conducting elements associated with the external conductors at one end of the loop forming the balanced line, said internal conductors formed as a continuous conducting element extending across the loop intermediate its ends, and shunt cross-over conducting means including impedance matching elements also intermediate the ends of the loop for coupling said balanced line to said coaxial cable, said last means comprising an effective conductive connection from the internal conductor of the coaxial cable to the other of said external conductors and a shunting impedance extending from the first external conductor into the other external conductor of said loop.

4. In combination, a coupling unit formed as a unitary structure providing at one end a pair of balanced coaxial lines including rigid external conductive members and rigid internal members, the latter having spring compressible and extensible sections, a balanced antenna structure having receptors thereon positioned to receive the ends of the inner conductors of the pair of balanced coaxial lines, said ends being provided with a friction fit for said receptors and external shield means surrounding said coupling unit having elements cooperating with elements in said antenna structure for conductively attaching said shield thereto.

References Cited in the file of this patent

UNITED STATES PATENTS

| Number | Name | Date |
| --- | --- | --- |
| 2,111,743 | Blumlein | Mar. 22, 1938 |
| 2,231,152 | Buschbeck | Feb. 11, 1941 |
| 2,312,827 | Lindenblad | Mar. 2, 1943 |
| 2,530,048 | Driscoll | Nov. 14, 1950 |
| 2,567,577 | Pariser | Sept. 11, 1951 |